(12) United States Patent
Eilers et al.

(10) Patent No.: US 10,487,961 B2
(45) Date of Patent: Nov. 26, 2019

(54) CONTROL VALVE TRIM ASSEMBLY

(71) Applicant: FISHER CONTROLS INTERNATIONAL LLC, Marshalltown, IA (US)

(72) Inventors: Daniel J. Eilers, Marshalltown, IA (US); Kyle Thomas McNulty, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/866,108

(22) Filed: Jan. 9, 2018

(65) Prior Publication Data

US 2019/0101229 A1    Apr. 4, 2019

Related U.S. Application Data

(60) Provisional application No. 62/566,118, filed on Sep. 29, 2017.

(51) Int. Cl.
| | |
|---|---|
| *F16K 47/08* | (2006.01) |
| *F16K 3/24* | (2006.01) |
| *F16L 55/02* | (2006.01) |
| *B33Y 80/00* | (2015.01) |

(52) U.S. Cl.
CPC ............ *F16K 47/08* (2013.01); *B33Y 80/00* (2014.12); *F16K 3/246* (2013.01); *F16L 55/02* (2013.01)

(58) Field of Classification Search
CPC ........... F16K 47/08; F16K 47/12; F16K 47/14
See application file for complete search history.

(56) References Cited

U.S. PATENT DOCUMENTS

| | | | | |
|---|---|---|---|---|
| 4,456,033 | A | * 6/1984 | Kay | ............... F16K 47/08 137/14 |
| 6,382,253 | B1 | * 5/2002 | McCarty | ............. F16K 47/08 137/625.33 |
| 2007/0240774 | A1 | 10/2007 | McCarty | |
| 2009/0183790 | A1 | * 7/2009 | Moore | ............... B22F 3/1055 137/597 |
| 2014/0014493 | A1 | * 1/2014 | Ryan | ............... B01J 19/30 203/89 |

(Continued)

FOREIGN PATENT DOCUMENTS

| | | |
|---|---|---|
| WO | WO-0169114 A1 | 9/2001 |
| WO | WO-2008079593 A2 | 7/2008 |
| WO | WO-2017018173 A1 | 2/2017 |

OTHER PUBLICATIONS

Definition of Lattice by Merriam-Webster; Retrieved from www.merriam-webster.com/dictionary/lattice.*

(Continued)

*Primary Examiner* — Reinaldo Sanchez-Medina
*Assistant Examiner* — Nicole Gardner
(74) *Attorney, Agent, or Firm* — Marshall, Gerstein & Borun LLP (57) ABSTRACT

A control valve has a trim assembly to condition the flow of fluid through the control valve and, in some applications, to provide guidance for a valve plug. The trim assembly has a lattice structure formed of a plurality of triply periodic surfaces that form a plurality of passages that extend between an inner surface of the circumferential wall and an outer surface of the circumferential wall.

19 Claims, 12 Drawing Sheets

(56) References Cited

U.S. PATENT DOCUMENTS

2016/0341335 A1 11/2016 Adams et al.
2018/0112800 A1 4/2018 Griffin, Jr. et al.

OTHER PUBLICATIONS

8580 Product Bulletin dated Aug. 2017, 16 pgs.
A31 D Instructional Manual dated Jun. 2017, 28 pgs.
V260 Instructional Manual dated Jul. 2017, 16 pp.
International Search Report for PCT/US2018/050580 dated Dec. 11, 2018, 6 pgs.
Written Opinion for PCT/US2018/050580 dated Dec. 11, 2018, 10 pgs.

\* cited by examiner

CONTROL VALVE TRIM ASSEMBLY

CROSS-REFERENCE TO RELATED APPLICATIONS

This application claims priority to U.S. Provisional Patent Application No. 62/566,118, entitled "Control Valve Trim Assembly" and filed Sep. 29, 2017, the entire disclosure of which is hereby incorporated by reference herein.

FIELD OF THE DISCLOSURE

This disclosure relates generally to control valves and, more particularly, to trim assemblies for control valves.

BACKGROUND

In typical control valves, a trim assembly, such as a valve cage, may be used to condition the flow of fluid through the control valve, reduce noise, cavitation, and turbulence through the control valve, and in some applications can also be used to provide guidance for a fluid control member or valve plug as the valve plug moves from a closed position in which the valve plug sealingly engages a valve seat to an open position in which the valve plug is disposed away from the valve seat. When the control valve is in the open position, fluid flows from a valve inlet, passes through a passage between the valve seat and the valve plug, passes through the trim assembly where the fluid flow is conditioned, and exits through a valve outlet.

In some applications, the trim assembly/cage will have a plurality of passages formed through a circumferential wall, which are used to reduce the noise produced as the gas passes through the cage. The passages are spaced specifically such that the jets of gas that are produced as the gas exits the passages do not converge and produce aerodynamic noise. Cages used in these types of applications are typically used in a "flow up" orientation (e.g., fluid enters the center of the cage and passes from an inside surface to an outside surface) and the spacing of the passages that is crucial to reduce the aerodynamic noise is on the outer surface of the cage. The spacing of the passages on the inner surface of the cage is also important, as this spacing is used to keep sufficient space between the passages to not allow flow to pass through more passages than desired for accurate flow characteristics throughout the travel of the valve plug.

For solid cages used in applications where the process conditions produce aerodynamic noise as the fluid flows through the control valve, drilled holes through the circumferential wall of the cage are typically used to form the passages. However, drilled hole cages are very cumbersome, time consuming, and costly to produce. Some drilled hole cages may contain thousands of holes and the only real feasible way to produce the passages was to drill them. Acceptance criteria exists that allows a percentage of drill bits to break and be left in the cage and this process requires the use of special drilling machines that have a high degree of accuracy.

In addition to the spacing of the passages on the outer surface of the cage, aerodynamic noise can also be reduced by providing a tortured, or non-linear, flow path for the passages or by varying the cross-sectional diameter of the passages as they pass through the wall of the cage. However, with drilled holes through a solid cage, creating passages having a non-linear flow path or having a variable cross-sectional area is not possible.

BRIEF SUMMARY OF THE DISCLOSURE

In accordance with one exemplary aspect of the present invention, a control valve comprises a body having an inlet and an outlet, a valve seat positioned in a passageway of the body between the inlet and the outlet, a valve plug positioned within the body, and a trim assembly disposed within the body adjacent the valve seat and proximate the valve plug to provide guidance for the valve plug and to condition the flow of fluid through the control valve. The valve plug is movable between a closed position, in which the valve plug sealingly engages the valve seat, and an open position, in which the valve plug is spaced away from the valve seat. The trim assembly has a circumferential wall having a lattice structure formed of a plurality of triply periodic surfaces that form a plurality of passages that extend between an inner surface of the circumferential wall and an outer surface of the circumferential wall.

In further accordance with any one or more of the foregoing exemplary aspects of the present invention, a control valve may further include, in any combination, any one or more of the following preferred forms.

In one preferred form, the triply periodic surfaces are a gyroid.

In another preferred form, the plurality of passages have entirely arcuate surfaces.

In another preferred form, the triply periodic surfaces are oriented such that there are no unimpeded radial flow paths through the circumferential wall.

In another preferred form, the trim assembly has a first base plate adjacent a first end of the circumferential wall and a second base plate adjacent a second end of the circumferential wall, opposite the first end.

In another preferred form, the trim assembly has a plurality of supports extending between and interconnecting the first base plate and the second base plate, the plurality of supports providing guidance for the valve plug.

In accordance with another exemplary aspect of the present invention, a cage for a control valve is disposed within a body of the control valve adjacent a valve seat and proximate a valve plug to provide guidance for the valve plug and to condition the flow of fluid through the control valve. The cage has a circumferential wall having a lattice structure formed of a plurality of triply periodic surfaces that forms a plurality of passages that extend between an inner surface of the circumferential wall and an outer surface of the circumferential wall.

In further accordance with any one or more of the foregoing exemplary aspects of the present invention, a cage for a control valve may further include, in any combination, any one or more of the following preferred forms.

In one preferred form, the triply periodic surfaces are a gyroid.

In another preferred form, the plurality of passages have entirely arcuate surfaces.

In another preferred form, the triply periodic surfaces are oriented such that there are no unimpeded radial flow paths through the circumferential wall.

In another preferred form, a first base plate is adjacent a first end of the circumferential wall and a second base plate is adjacent a second end of the circumferential wall, opposite the first end.

In another preferred form, a plurality of supports extend between and interconnect the first base plate and the second base plate and provide guidance for the valve plug.

In accordance with another exemplary aspect of the present invention, a control valve comprises a body having an inlet and an outlet, a valve seat positioned in a passageway of the body between the inlet and the outlet, a fluid control member positioned within the body and movable between a closed position and an open position, and a means for conditioning the flow of fluid through the control valve. The means for conditioning includes a lattice structure formed of a plurality of triply periodic surfaces that form a plurality of passages that extend between a first surface of the lattice structure and a second surface of the lattice structure, opposite the first surface.

In further accordance with any one or more of the foregoing exemplary aspects of the present invention, a control valve may further include, in any combination, any one or more of the following preferred forms.

In one preferred form, the control valve is a ball valve.

In another preferred form, the means for conditioning is positioned within the body downstream of the fluid control member or within an aperture formed through the fluid control member of the ball valve.

In another preferred form, the control valve is a butterfly valve.

In another preferred form, the means for conditioning is secured to the fluid control member or is positioned downstream of the fluid control member.

In another preferred form, the control valve is a sliding stem valve.

In another preferred form, the triply periodic surfaces are gyroid.

In another preferred form, the plurality of passages have entirely arcuate surfaces.

In another preferred form, the triply periodic surfaces are oriented such that there are no unimpeded flow paths through the lattice structure.

DETAILED DESCRIPTION

Figure 1:
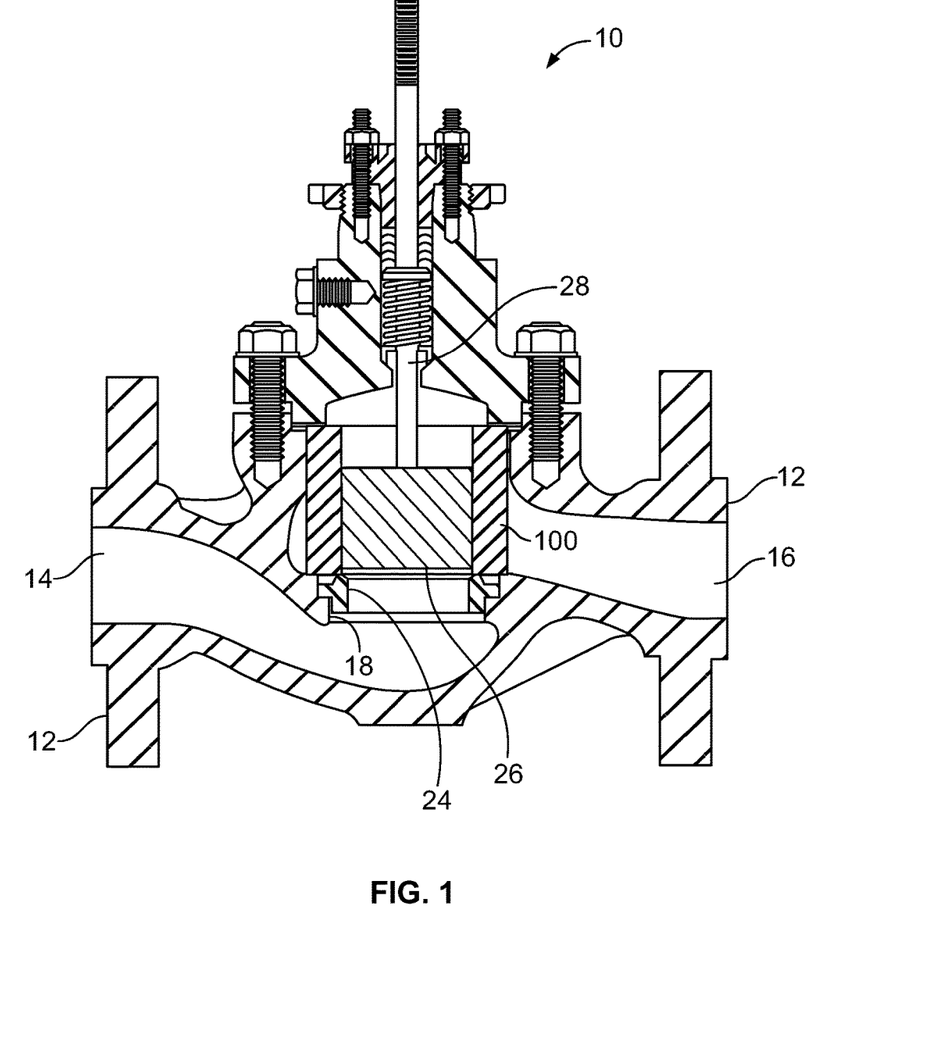
FIG. 1 is a cross-sectional view of an example control valve.

Referring to FIG. 1, an example sliding stem control valve 10 is shown. Control valve 10 generally includes a valve body 12 having an inlet 14, an outlet 16, and a passageway 18 disposed between inlet 14 and outlet 16. A valve seat 24 is disposed in passageway 18 between inlet 14 and outlet 16 and a trim assembly 100, such as a cage, is disposed within valve body 12 adjacent valve seat 24. A fluid control member, such as valve plug 26, is positioned within valve body 12 and is disposed within trim assembly 100. Valve plug 26 interacts with the valve seat 24 to control fluid flow through valve body 12, such that valve plug 26 is movable between a closed position in which it sealingly engages valve seat 24 and an open position in which it is spaced away from valve seat 24. A stem 28 is connected to valve plug 26 at one end and to an actuator at another end. The actuator controls movement of valve plug 26 within trim assembly 100, which in this example is positioned adjacent valve seat 24 and proximate valve plug 26 to provide guidance for valve plug 26.

Figure 2:
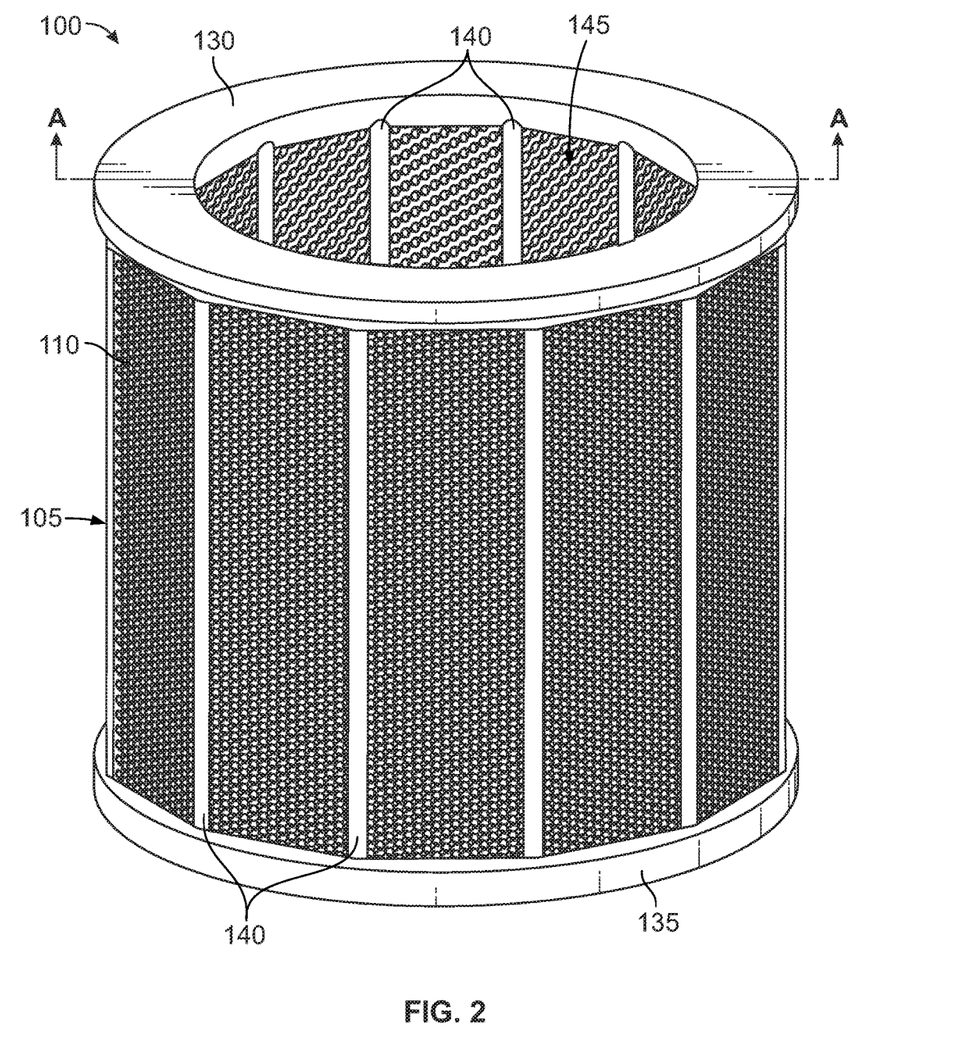
FIG. 2 is a perspective view of an example trim assembly of the control valve of FIG. 1.
Figure 3:
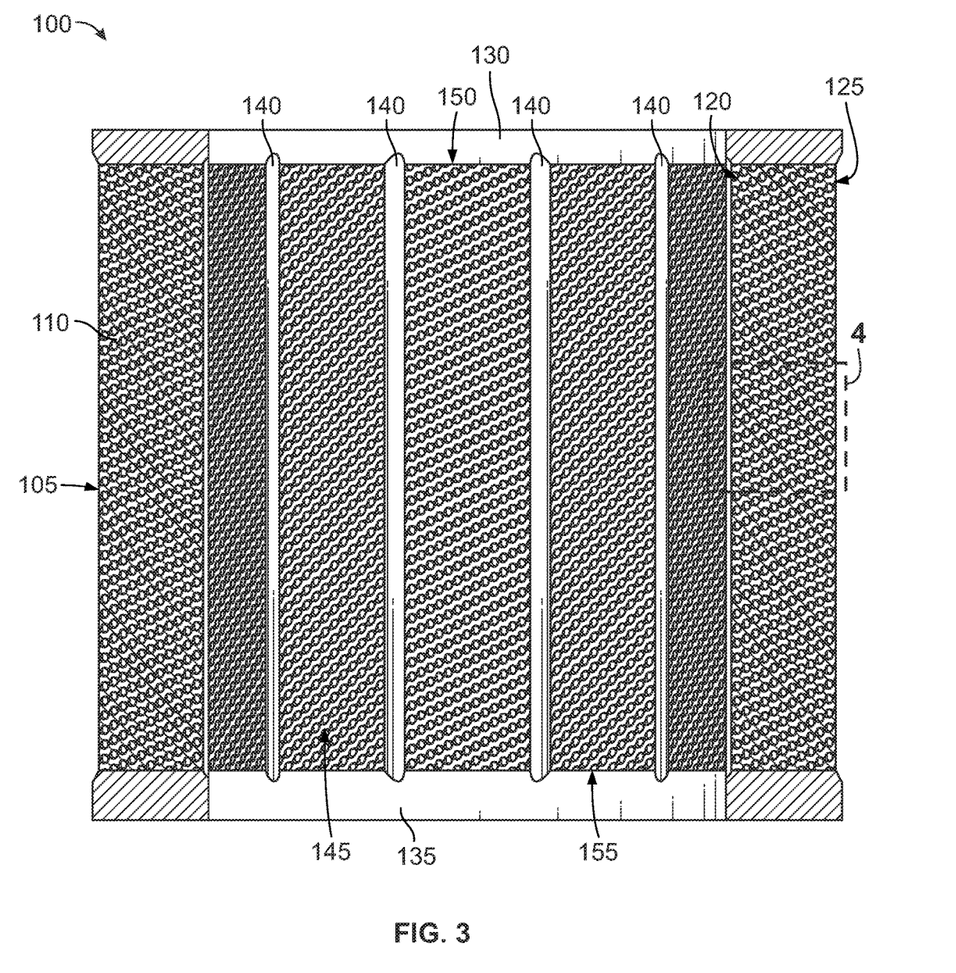
FIG. 3 is a cross-sectional view of the trim assembly of FIG. 2 taken along the line A-A in FIG. 2.
Figure 4:
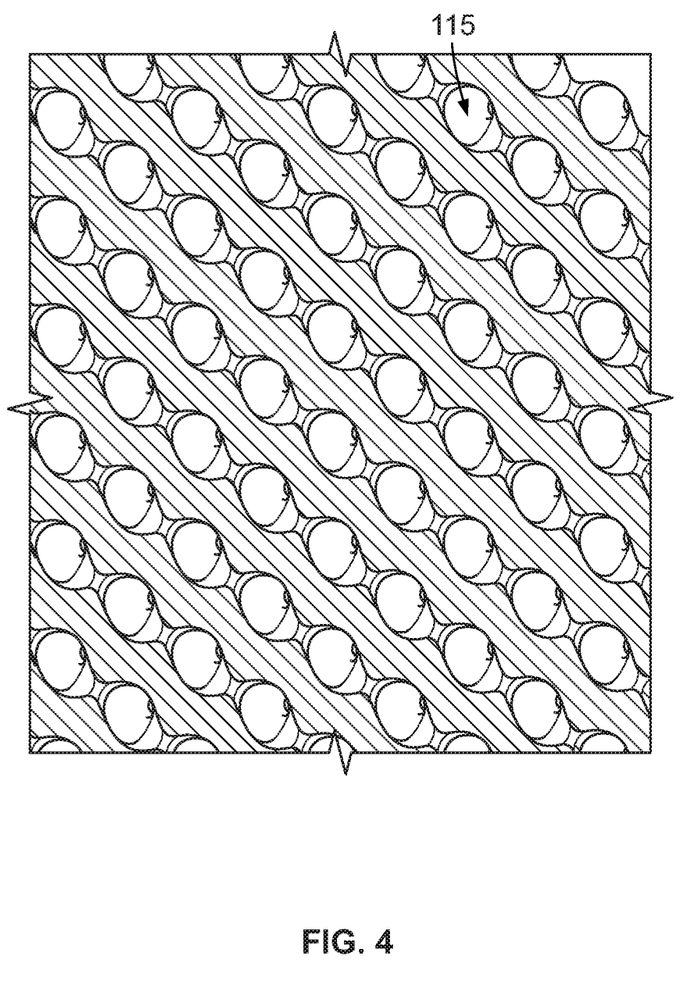
FIG. 4 is an enlarged view of a portion of the trim assembly of FIG. 3.

Referring to FIGS. 2-4, one example of a trim assembly/cage 100 is shown that can be used with control valve 10 to condition the flow of fluid through control valve 10 by reducing noise, turbulence, and cavitation. Trim assembly 100 can be used in any high pressure drop liquid or gas application where noise and cavitation through control valve 10 may be a concern.

Trim assembly 100 generally has a circumferential wall 105 forming a hollow central bore 145, within which valve plug 26 will slide to control fluid flow through trim assembly 100. Wall 105 defines a first end 150, an opposing second end 155, an inner surface 120, and an opposing outer surface 125. Base plates 130, 135 are positioned adjacent opposite first and second ends 150, 155 of wall 105 to prevent the flow of fluid longitudinally into the ends of wall 105. In addition, in the particular example shown, trim assembly 100 includes a plurality of supports 140, which are shown as cylindrical rods, that extend longitudinally between and interconnect base plates 130, 135 and are spaced radially around bore 145. If needed, supports 140 can provide added structural rigidity to trim assembly 100 and can be positioned adjacent an inner surface of base plates 130, 135 to provide guidance for valve plug 26. Supports 140 can also be spaced apart from an inner surface of wall 105 so that valve plug 26 does not engage wall 105. Additional supports 140 can also be positioned adjacent an outer surface of base plates 130, 135 and spaced apart from an outer surface of wall 105 to that wall 105 does not engage valve body 12. Alternatively, supports could be planar and extend from the inner surface to the outer surface of base plates 130, 135.

Circumferential wall 105 has a lattice structure 110 formed of a plurality of triply periodic surfaces that form a plurality of passages 115 extending between inner surface 120 and outer surface 125 of wall 105. Passages 115 can be used to characterized and/or condition fluid flowing through trim assembly 100 by, for example, reducing the pressure of the fluid as it flows through passages 115. Circumferential wall 105 and lattice structure 110 can be manufactured using Additive Manufacturing Technology, such as direct metal laser sintering, full melt powder bed fusion, etc. Using an Additive Manufacturing Technology process, the 3-dimensional design of wall 105/lattice structure 110 is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed wall 105/lattice structure 110. Using an Additive Manufacturing Technology process to manufacture trim assemblies/cages for control valves allows the freedom to produce passages having various shapes, geometries, and features that are not possible using current standard casting or drilling techniques. In addition to wall 105/lattice structure 110, base plates 130, 135 and supports 140 could also be manufactured using Additive Manufacturing Technology and then assembled together with wall 105 or the entire trim assembly 100 could be manufactured as a single unit using Additive Manufacturing Technology.

Figure 5:
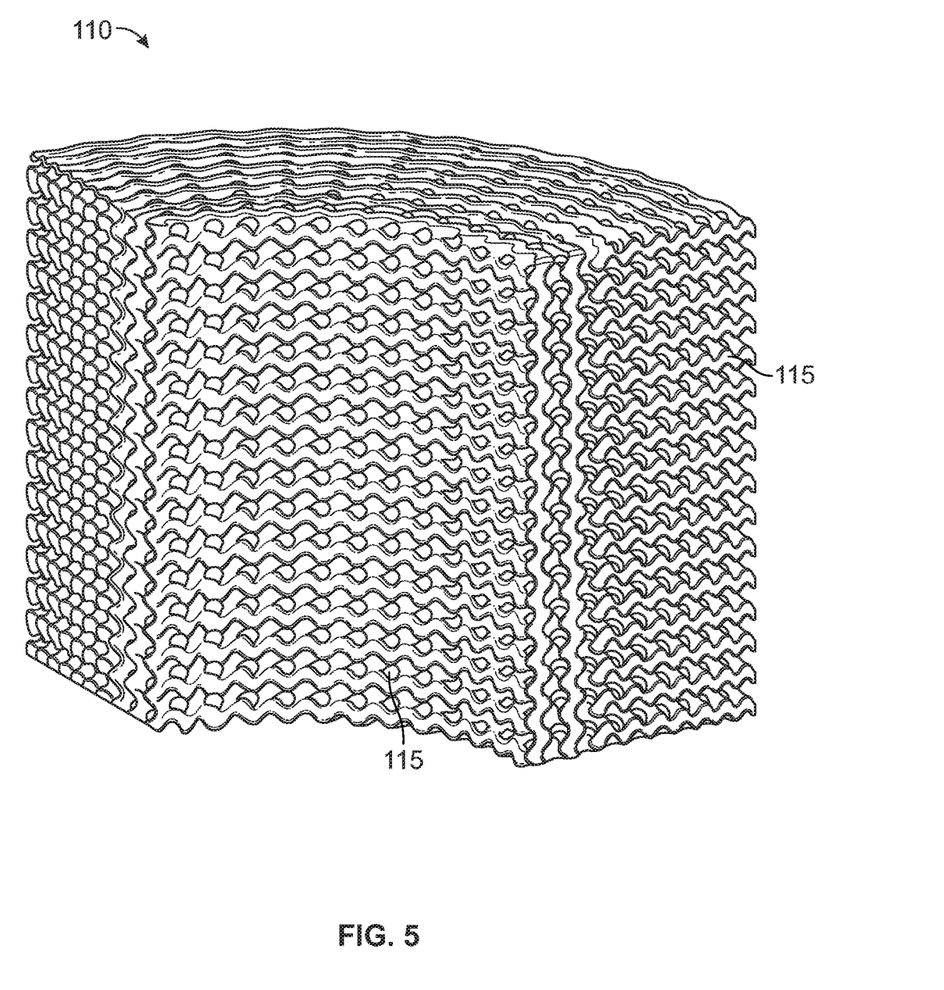
FIG. 5 is a partial perspective view of an example gyroid-like lattice structure that is periodic in cylindrical coordinates that can be used in the trim assembly of FIG. 3.
Figure 6:
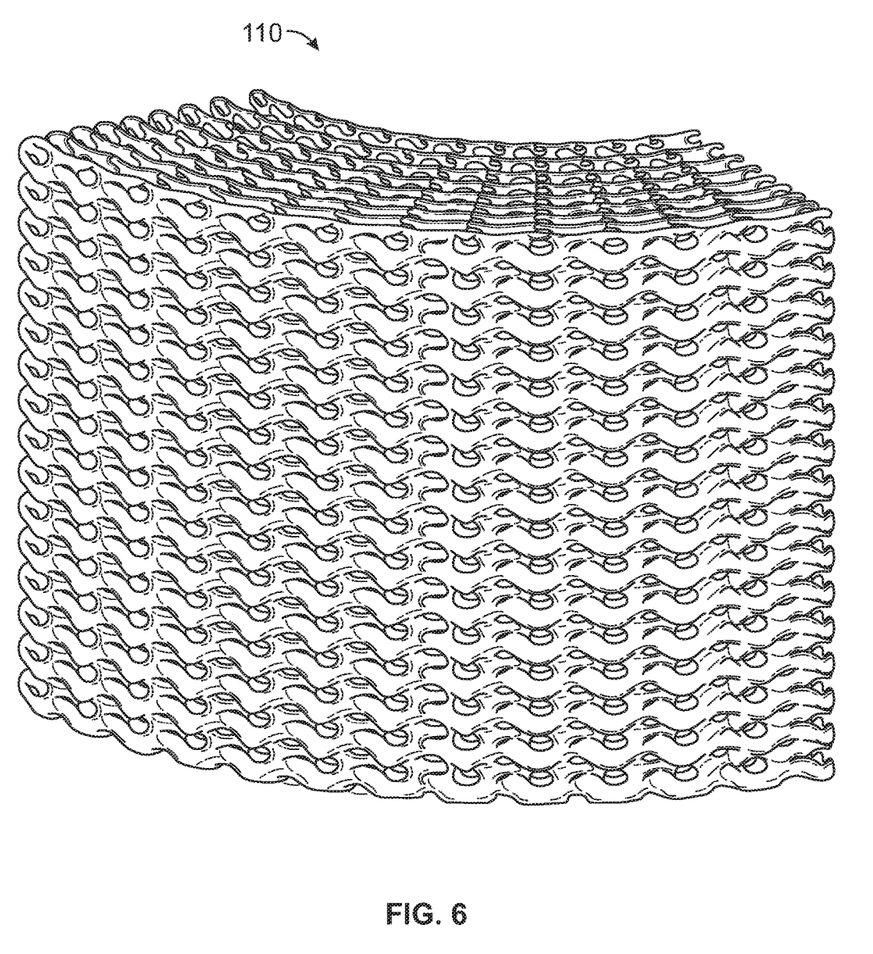
FIG. 6 is another perspective view of the lattice structure of FIG. 5.

In the example shown in FIGS. 2-4, lattice structure 110 can be formed by triply periodic surfaces that are gyroids or gyroid-like. A gyroid is an infinitely connected triply periodic minimal surface that contains no straight lines or planar symmetries. For example, as shown in FIGS. 5-6, lattice structure 110 could be formed by gyroid or gyroid-like triply periodic surfaces that are periodic in cylindrical coordinates and can be represented by the equation:

$$\cos(\omega_r\sqrt{x^2+y^2}+\phi_r)\cos(\omega_z z+\phi_z)\cos(\omega_\theta \tan^{-1}(y/x)+\phi_\theta)+$$
$$\sin(\omega_r\sqrt{x^2+y^2}+\phi_r)\sin(\omega_z z+\phi_z)\sin(\omega_\theta \tan^{-1}(y/x)+\phi_\theta)=0$$

Other possible cylindrically periodic gyroid-like triply periodic surfaces that can be used to form lattice structure 110 can be represented by the equation:

$$\cos(\omega_r\sqrt{x^2+y^2}\phi_r)\sin(\omega_z z \phi_z)+\cos(\omega_z z+\phi_z)\sin(\omega_\theta \tan^{-1}(y/x)+\phi_\theta)\sin(\omega_r\sqrt{x^2+y^2}+\phi_r)+\cos(\omega_\theta \tan^{-1}(y/x)+\phi_\theta)\sin(\omega_r\sqrt{x^2+y^2}+\phi_r)=0$$

In the above equations, the ω values control the frequency in that direction (r for radial, z for axial, and θ for tangential) and the φ values control the phase shift of where in the part the periodic surfaces begin. The gyroid-like triply periodic surfaces represented by the equations above are cylindrical lattice structures and therefore, can be used to form a cylindrical circumferential wall 105.

Figure 7:
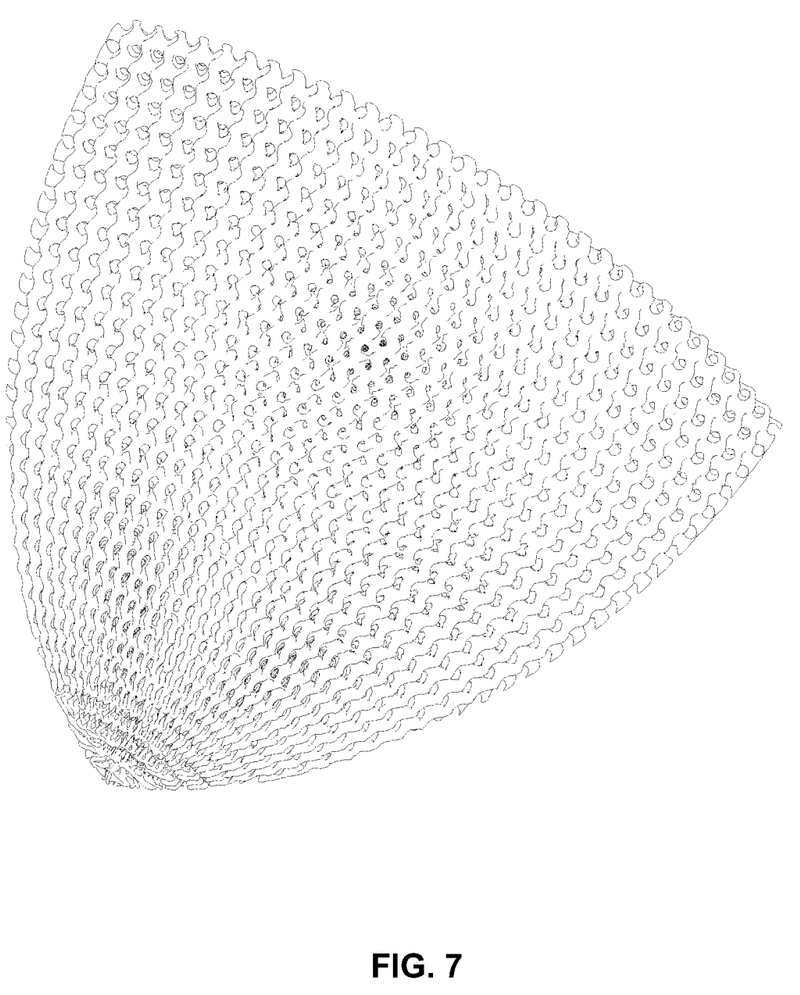
FIG. 7 is a partial perspective view of another example gyroid-like lattice structure that is periodic in spherical coordinates.
Figure 8:
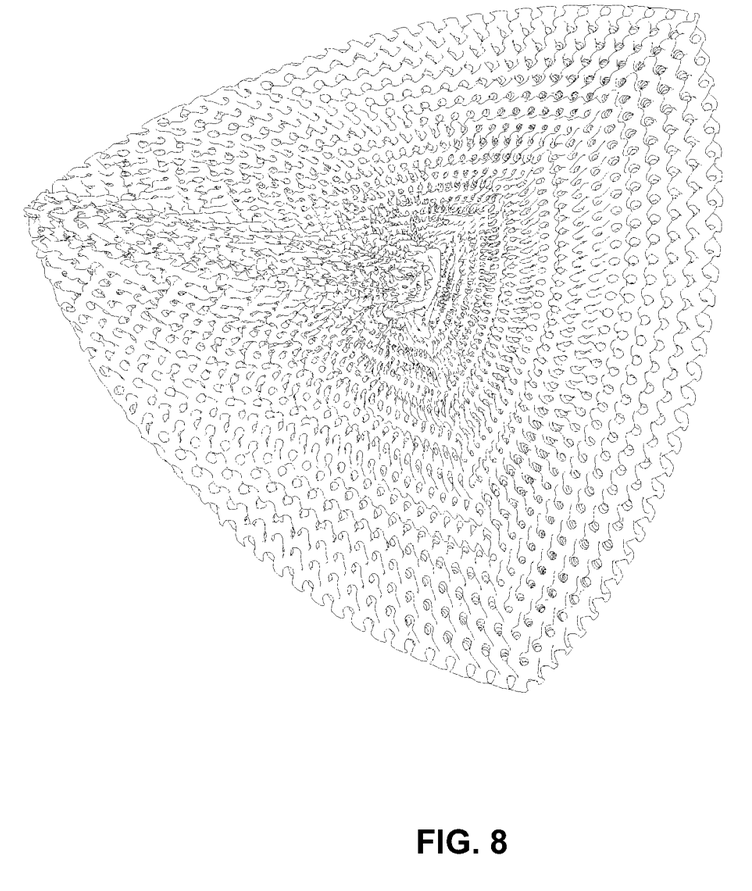
FIG. 8 is another perspective view of the lattice structure of FIG. 7.

The lattice structure shown in FIGS. 7-8 is similar to that shown in FIGS. 5-6, but the gyroid-like triply periodic surfaces are periodic in spherical coordinates and can be represented by the equation:

$$\cos\left(\omega_r\sqrt{x^2+y^2+z^2}+\phi_r\right)\sin\left(\omega_\varphi\cos^{-1}\left(\frac{z}{\sqrt{x^2+y^2+z^2}}\right)+\phi_\varphi\right)+$$
$$\cos\left(\omega_\varphi\cos^{-1}\left(\frac{z}{\sqrt{x^2+y^2+z^2}}\right)+\phi_\varphi\right)\sin\left(\omega_\theta\tan^{-1}\left(\frac{y}{x}\right)+\phi_\theta\right)+$$
$$\cos\left(\omega_\theta\tan^{-1}\left(\frac{y}{x}\right)+\phi_\theta\right)\sin\left(\omega_r\sqrt{x^2+y^2+z^2}+\phi_r\right)=0$$

Again, in the above equation, the ω values control the frequency in that direction (r for radial, z for axial, and θ for tangential) and the φ values control the phase shift of where in the part the periodic surfaces begin.

Whether lattice structure 110 is formed using gyroids or gyroid-like triply periodic surfaces as described above, passages 115 formed through lattice structure 110 will have entirely arcuate surfaces. In addition, the triply periodic surfaces are also preferably oriented so that there are no unimpeded radial flow paths through wall 105. The arcuate surfaces provide losses to reduce the pressure of the fluid flow through trim assembly 100 and minimize the turbulence and separation that can occur using other trim types. Therefore, noise produced by fluid flowing through lattice structure 110 of trim assembly 100 is minimized. When used in liquid applications, lattice structure 110 can also provide a consistent pressure reduction as the fluid flow travels thru trim assembly 100. This allows the minimum pressure to be as high as possible, which reduces the possibility of cavitation.

Lattice structure 110 can be almost any volume ratio, which provides possible trim tiers (e.g., more open area=more capacity and less noise attenuation; or more open area=more capacity and lower acceptable pressure drop before cavitation issues). In addition, the ratio of the amount of material to the total volume of the trim assembly can be adjusted throughout the cage. For example, the ratio could be adjusted so that the cross-sectional areas of the passages at the inner surface are smaller than the cross-sectional areas of the passages at the outer surface, the cross-sectional areas of the passages located near the bottom of the trim assembly are smaller than the cross-sectional areas of the passages near the top of the trim assembly, etc.

Figure 9:
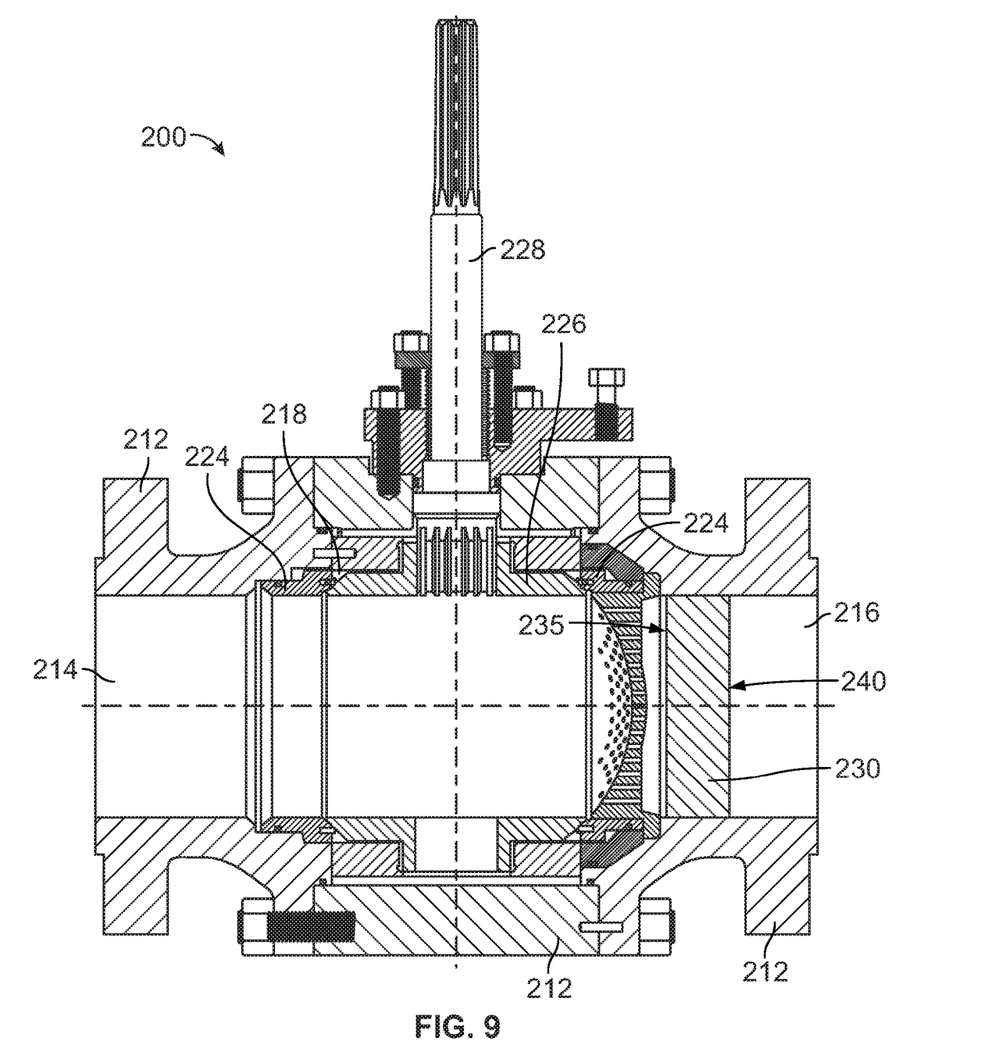
FIG. 9 is a cross-sectional view of another example control valve with a lattice structure positioned downstream of the fluid control member.
Figure 10:
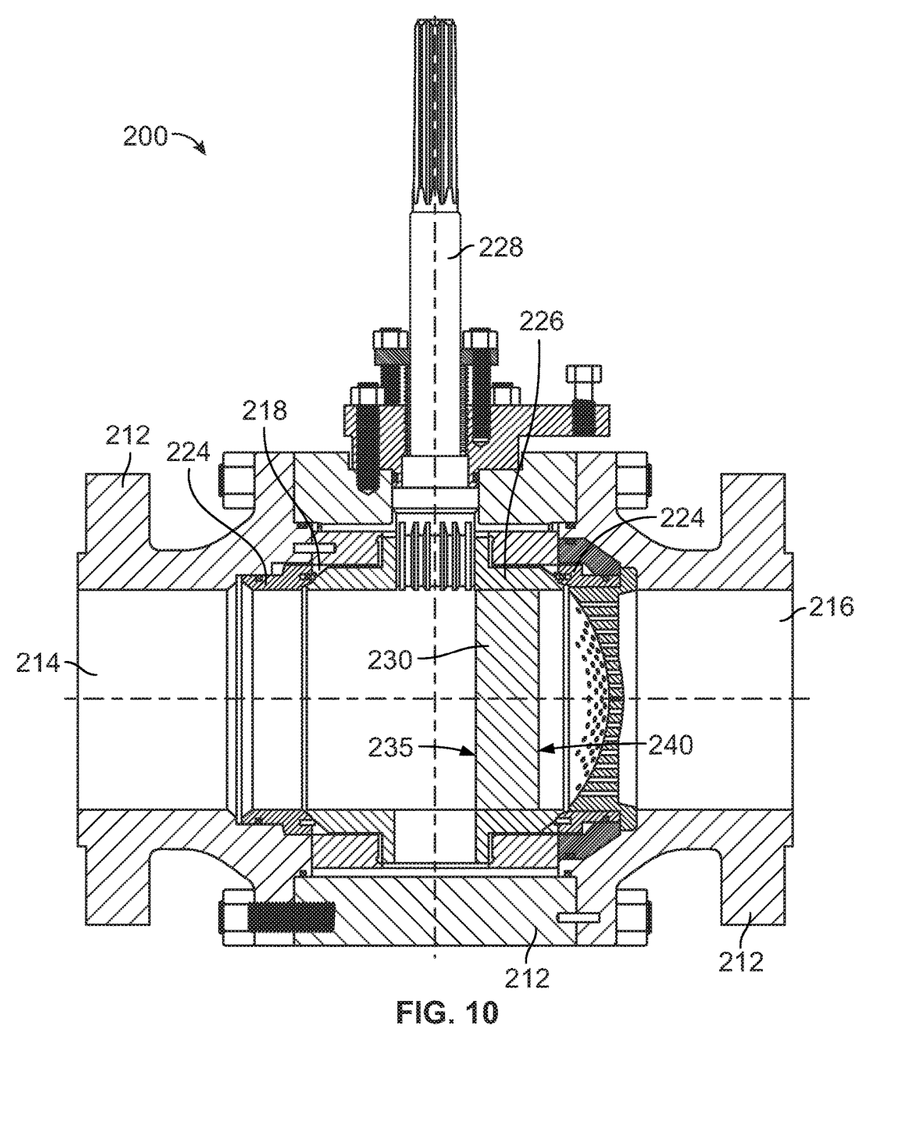
FIG. 10 is a cross-sectional view of the control valve of FIG. 9 with the lattice structure positioned within an aperture formed through the fluid control member.

Referring to FIGS. 9-10, another example control valve 200 is shown, which in this example is a ball valve. Control valve 200 generally includes a valve body 212 having an inlet 214, an outlet 216, and a passageway 218 disposed between inlet 214 and outlet 216. A valve seat 224 is positioned within valve body 212 and disposed in passageway 218 between inlet 214 and outlet 216. A fluid control member 226, which in this example is a ball having an aperture formed radially through fluid control member 226, is positioned within valve body 212 and interacts with the valve seat 224 to control fluid flow through valve body 212, such that fluid control member 226 is movable between a closed position, in which the aperture is not aligned with the fluid flow to prevent the flow of fluid through control valve 200, and an open position, in which the aperture is aligned with the fluid flow to allow the flow of fluid through control valve 200. A stem 228 is connected to fluid control member 226 at one end and to an actuator at another end, which controls rotational movement of fluid control member 226.

A lattice structure 230 can be positioned within valve body 212 downstream of fluid control member 226 (FIG. 9), or can be positioned within the aperture through fluid control member 226 (FIG. 10), to condition the flow of fluid through control valve 200. Similar to lattice structure 110 described above, lattice structure 230 is formed of a plurality of triply periodic surfaces, such as gyroids or gyroid-like surfaces, that form a plurality of passages extending through lattice structure 230 from a first, upstream surface 235 to a second, downstream surface 240, opposite the first, upstream surface 235. The passages can be used to characterized and/or condition fluid flowing through control valve 200 by, for example, reducing the pressure of the fluid as it flows through the passages. Lattice structure 230 can be manufactured using Additive Manufacturing Technology, such as direct metal laser sintering, full melt powder bed fusion, etc., as described above.

In the examples shown in FIGS. 9-10, the triply periodic surfaces can be gyroids that are periodic in Cartesian coordinates and approximated by the equation: $\cos(x)\sin(y)+\cos(y)\sin(z)+\cos(z)\sin(x)=0$. Since a gyroid is a planar lattice structure, multiple planar sections of gyroid lattice structure can be formed and abutted to form lattice structure 230. As described above for lattice structure 110, whether lattice structure 230 is formed using gyroids or one of the other triply periodic surfaces, the passages formed through lattice structure 230 will have entirely arcuate surfaces. In addition, the triply periodic surfaces are also preferably oriented so that there are no unimpeded linear flow paths through lattice structure 230.

Figure 11:
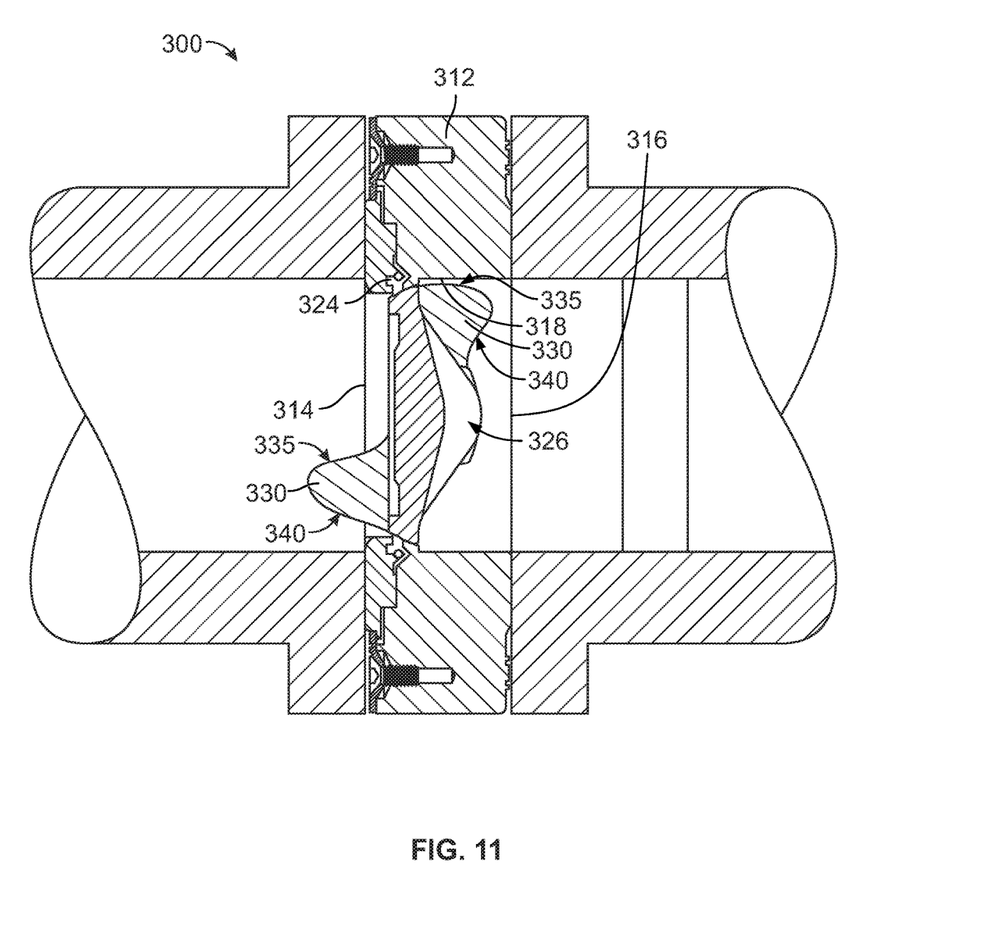
FIG. 11 is a cross-sectional view of another example control valve with a lattice structure secured to the fluid control member.
Figure 12:
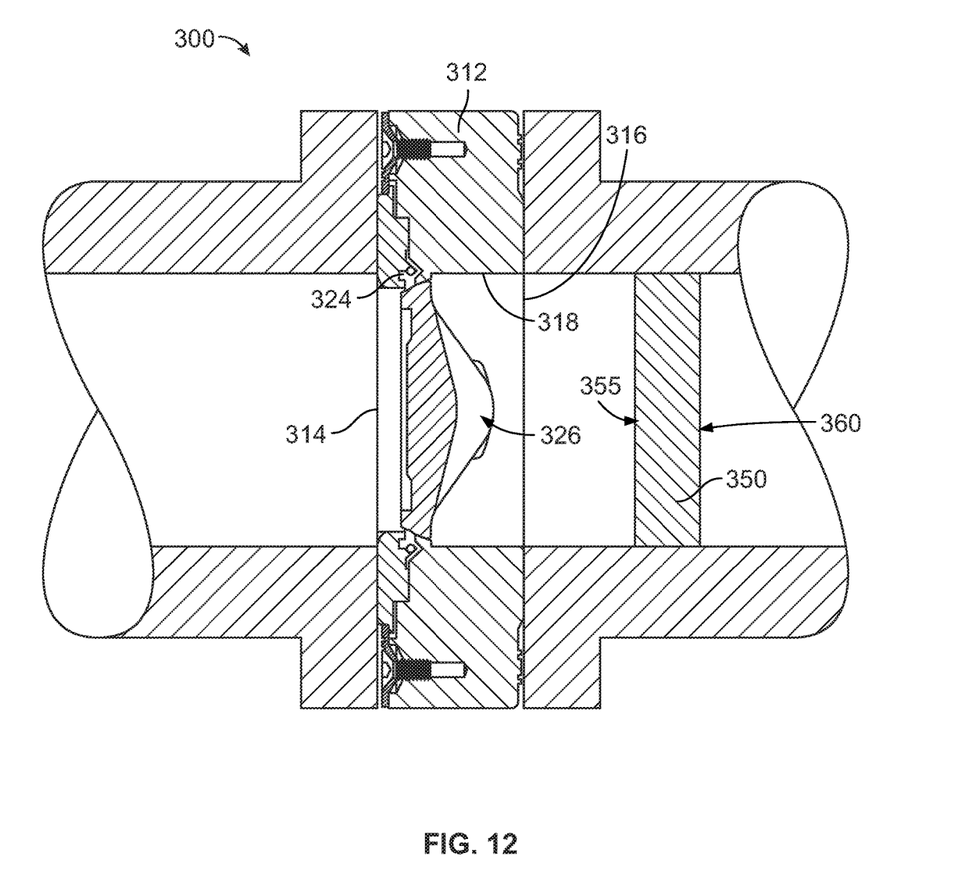
FIG. 12 is a cross-sectional view of the control valve of FIG. 11 with the lattice structure positioned downstream of the fluid control member.

Referring to FIGS. 11-12, another example control valve 300 is shown, which in this example is a butterfly valve. Control valve 300 generally includes a valve body 312 having an inlet 314, an outlet 316, and a passageway 318 disposed between inlet 314 and outlet 316. A valve seat 324 is positioned within valve body 312 and disposed in passageway 318 between inlet 314 and outlet 316. A fluid control member 326, which in this example is a planar disc, is positioned within valve body 312 and interacts with valve seat 324 to control fluid flow through valve body 312, such that fluid control member 326 is movable between a closed position, in which fluid control member 326 engages valve seat 324 and is perpendicular to the fluid flow to prevent the flow of fluid through control valve 300, and an open position, in which fluid control member 326 is spaced apart from valve seat 324 and is parallel to the fluid flow to allow the flow of fluid through control valve 300. A stem is connected to fluid control member 326 at one end and to an actuator at another end, which controls rotational movement of fluid control member 326.

As shown in FIG. 11, a lattice structure 330 can be secured to fluid control member 326, on opposite sides of fluid control member 226, to condition the flow of fluid through control valve 300 when fluid control member 326 is in the open position. Alternatively, as shown in FIG. 12, a lattice structure 350 can be positioned downstream of fluid control member 326 to condition the flow of fluid through control valve 300 when fluid control member 326 is in the open position. Similar to lattice structure 110 described above, lattice structures 330, 350 are formed of a plurality of triply periodic surfaces, such as gyroids or gyroid-like surfaces described above, that form a plurality of passages extending through lattice structures 330, 350 from a first, upstream surface 335, 355 to a second, downstream surface 340, 360, opposite the first, upstream surface 335, 355. The passages can be used to characterized and/or condition fluid flowing through control valve 300 by, for example, reducing the pressure of the fluid as it flows through the passages. Lattice structures 330, 350 can be manufactured using Additive Manufacturing Technology, such as direct metal laser sintering, full melt powder bed fusion, etc., as described above.

As described above for lattice structure 110, whether lattice structures 330, 350 are formed using gyroids or one of the other triply periodic surfaces, the passages formed through lattice structures 330, 350 will have entirely arcuate surfaces. In addition, the triply periodic surfaces are also preferably oriented so that there are no unimpeded linear flow paths through lattice structures 330, 350.

While various embodiments have been described above, this disclosure is not intended to be limited thereto. Variations can be made to the disclosed embodiments that are still within the scope of the appended claims.

What is claimed is:

1. A control valve, comprising:
   a body having an inlet and an outlet;
   a valve seat positioned in a passageway of the body between the inlet and the outlet;
   a valve plug positioned within the body and movable between a closed position, in which the valve plug sealingly engages the valve seat, and an open position, in which the valve plug is spaced away from the valve seat; and
   a trim assembly disposed within the body adjacent the valve seat and proximate the valve plug to provide guidance for the valve plug and to condition a flow of fluid through the control valve, the trim assembly comprising a circumferential wall having a lattice structure formed of a plurality of triply periodic surfaces that are periodic in cylindrical or spherical coordinates, the lattice structure having a plurality of passages that extend between an inner surface of the circumferential wall and an outer surface of the circumferential wall.

2. The control valve of claim 1, wherein the triply periodic surfaces are a gyroid.

3. The control valve of claim 1, wherein the plurality of passages have entirely arcuate surfaces.

4. The control valve of claim 3, wherein the triply periodic surfaces are oriented such that there are no unimpeded linear radial flow paths in the plurality of passages through the circumferential wall.

5. The control valve of claim 1, wherein the trim assembly further comprises a first base plate adjacent a first end of the circumferential wall and a second base plate adjacent a second end of the circumferential wall, opposite the first end.

6. The control valve of claim 5, wherein the trim assembly further comprises a plurality of supports extending between and interconnecting the first base plate and the second base plate, the plurality of supports providing guidance for the valve plug.

7. A cage for a control valve, the cage comprising:
   a circumferential wall having a lattice structure formed of a plurality of triply periodic surfaces that are periodic in cylindrical or spherical coordinates, the lattice structure having a plurality of passages that extend between an inner surface of the circumferential wall and an outer surface of the circumferential wall; wherein
   the cage is disposed within a body of the control valve adjacent a valve seat and proximate a valve plug to provide guidance for the valve plug and to condition a flow of fluid through the control valve.

8. The cage of claim 7, wherein the triply periodic surfaces are a gyroid.

9. The cage of claim 7, wherein the plurality of passages have entirely arcuate surfaces.

10. The cage of claim 9, wherein the triply periodic surfaces are oriented such that there are no unimpeded linear radial flow paths in the plurality of passages through the circumferential wall.

11. The cage of claim 7, further comprising a first base plate adjacent a first end of the circumferential wall and a second base plate adjacent a second end of the circumferential wall, opposite the first end.

12. The cage of claim 11, further comprising a plurality of supports extending between and interconnecting the first base plate and the second base plate, the plurality of supports providing guidance for the valve plug.

13. A control valve, comprising:
   a body having an inlet and an outlet;
   a valve seat positioned in a passageway of the body between the inlet and the outlet;
   a fluid control member positioned within the body and movable between a closed position and an open position; and
   a means for conditioning a flow of fluid through the control valve, the means for conditioning comprising a lattice structure formed of a plurality of triply periodic surfaces that are periodic in cylindrical or spherical coordinates, the lattice structure having a plurality of passages that extend between a first surface of the lattice structure and a second surface of the lattice structure, opposite the first surface; wherein the control valve is a ball valve.

14. The control valve of claim 13, wherein the means for conditioning is positioned downstream of the fluid control member or within an aperture formed through the fluid control member of the ball valve.

15. The control valve of claim 13, wherein the triply periodic surfaces are gyroid.

16. The control valve of claim 13, wherein the plurality of passages have entirely arcuate surfaces.

17. The control valve of claim 16, wherein:
the first surface is an inner surface of the lattice structure;
the second surface is an outer surface of the lattice structure; and
the triply periodic surfaces are oriented such that there are no unimpeded linear flow paths in the plurality of passages through the lattice structure.

18. A control valve, comprising:
a body having an inlet and an outlet;
a valve seat positioned in a passageway of the body between the inlet and the outlet;
a fluid control member positioned within the body and movable between a closed position and an open position; and
a means for conditioning a flow of fluid through the control valve, the means for conditioning comprising a lattice structure formed of a plurality of triply periodic surfaces that are periodic in cylindrical or spherical coordinates, the lattice structure having a plurality of passages that extend between a first surface of the lattice structure and a second surface of the lattice structure, opposite the first surface;
wherein the control valve is a butterfly valve.

19. The control valve of claim 18, wherein the means for conditioning is secured to the fluid control member or is positioned downstream of the fluid control member.

* * * * *